(12) United States Patent
Moroz

(10) Patent No.: US 7,381,029 B2
(45) Date of Patent: Jun. 3, 2008

(54) MULTI-PIECE WIND TURBINE ROTOR BLADES AND WIND TURBINES INCORPORATING SAME

(75) Inventor: Emilian Mieczyslaw Moroz, San Diego, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/955,452

(22) Filed: Sep. 30, 2004

(65) Prior Publication Data

US 2006/0067827 A1    Mar. 30, 2006

(51) Int. Cl.
*F03D 1/06* (2006.01)
*F03D 11/04* (2006.01)

(52) U.S. Cl. ............... 416/132 B; 416/210 R
(58) Field of Classification Search .................. 416/23, 416/132 B, 169 R, 174, 205, 210 A, 210 R, 416/211, 211 R, 212 A
See application file for complete search history.

(56) References Cited

U.S. PATENT DOCUMENTS

| | | | |
|---|---|---|---|
| 2,478,252 A * | 8/1949 | Dean ........................ 416/147 |
| 4,081,221 A | 3/1978 | Andrews | |
| 4,879,483 A | 11/1989 | Barahia | |
| 5,096,381 A * | 3/1992 | Svenning .................. 416/135 |
| 5,269,655 A | 12/1993 | Chang | |
| 5,375,324 A * | 12/1994 | Wallace et al. .......... 29/889.21 |
| 5,499,904 A | 3/1996 | Wallace et al. | |
| 5,820,774 A | 10/1998 | Dietrich | |
| 6,173,491 B1 | 1/2001 | Goodwater et al. | |
| 6,347,660 B1 | 2/2002 | Sikkenga et al. | |
| 6,450,763 B1 | 9/2002 | Crum et al. | |
| 2004/0141288 A1 | 7/2004 | Franz et al. | |

* cited by examiner

*Primary Examiner*—Edward Look
*Assistant Examiner*—Nathaniel Wiehe
(74) *Attorney, Agent, or Firm*—Armstrong Teasdale LLP

(57) ABSTRACT

A multisection blade for a wind turbine includes a hub extender having a pitch bearing at one end, a skirt or fairing having a hole therethrough and configured to mount over the hub extender, and an outboard section configured to couple to the pitch bearing.

20 Claims, 4 Drawing Sheets

MULTI-PIECE WIND TURBINE ROTOR BLADES AND WIND TURBINES INCORPORATING SAME

STATEMENT REGARDING FEDERALLY SPONSORED RESEARCH & DEVELOPMENT

The U.S. Government has certain rights in this invention as provided for by the terms of Contract No. NREL-ZAM-4-31235-05, DE-AC36-99G010337 awarded by the Department of Energy, National Renewable Energy Laboratory Division.

BACKGROUND OF THE INVENTION

This invention relates to wind turbines, and more particularly to wind turbines having rotor blades built in more than one piece.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

As the power generating capacity of wind turbines increase, the dimensions of their rotor blades and other components also increase. At some point, practical transportation and logistics limits may be exceeded. These non-technical limitations lead to constraints on the energy production ratings of on-shore wind turbines.

BRIEF DESCRIPTION OF THE INVENTION

There is therefore provided, in some configurations of the present invention, a method for assembling a rotor of a wind turbine at a wind turbine site. The method includes shipping unassembled parts of a multisection rotor blade to the site, and assembling the multisection rotor blade at the site.

In other aspects, the present invention provides a multisection blade for a wind turbine. The multisection blade includes a hub extender having a pitch bearing at one end, a skirt or fairing having a hole therethrough and configured to mount over the hub extender, and an outboard section configured to couple to the pitch bearing.

In still other aspects, the present invention provides a wind turbine having a rotor that comprises multisection blades.

Configurations of the present invention will thus be seen to provide highly transportable components that can be assembled into large rotors at wind turbine sites. Also, various configurations of the present invention provide a method for more conveniently shipping and assembling rotors at wind turbine sites.

DETAILED DESCRIPTION OF THE INVENTION

Figure 1:
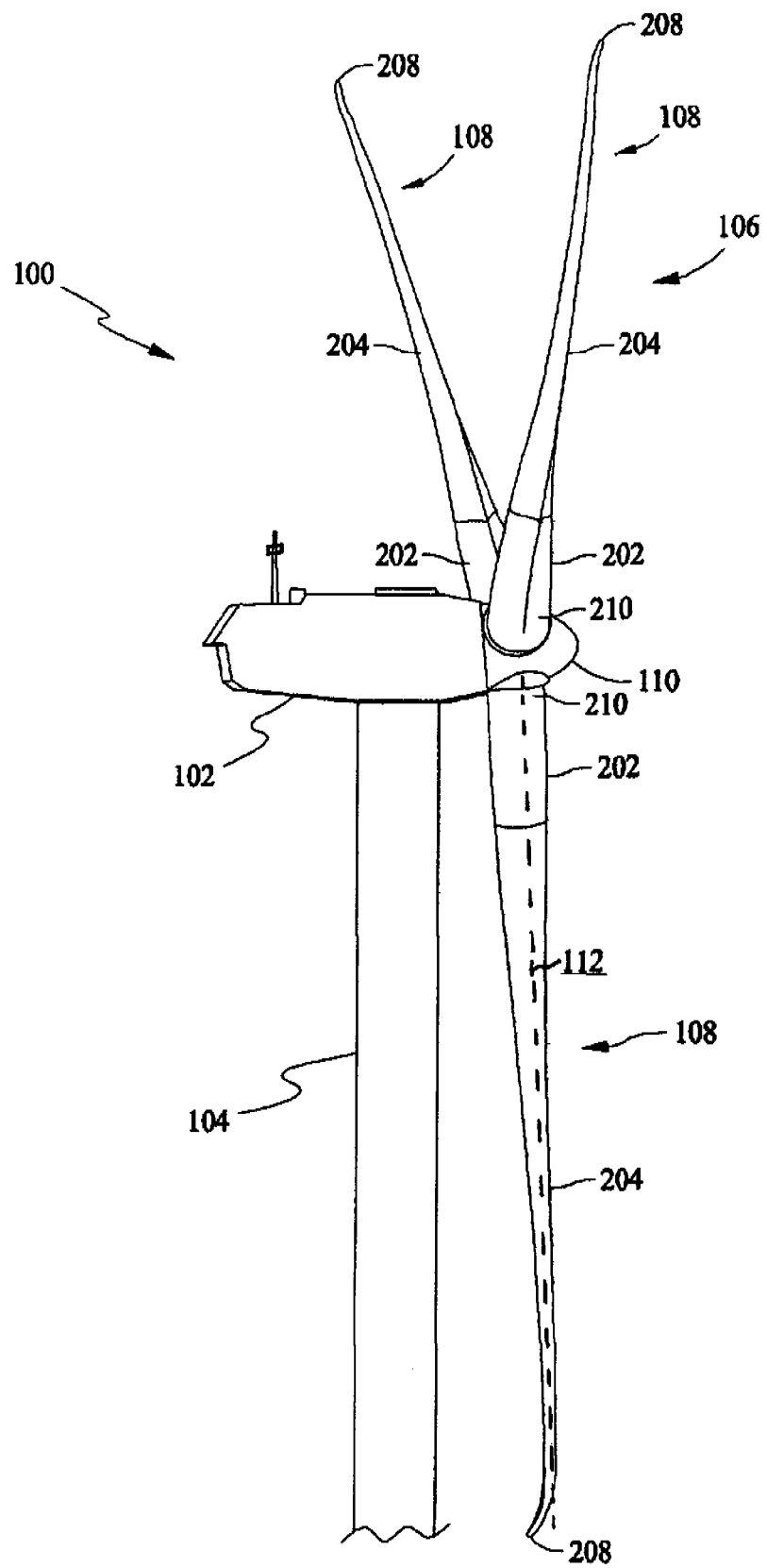
FIG. 1 is a drawing of an exemplary configuration of a wind turbine configuration of the present invention.

In some configurations and referring to FIG. 1, a wind turbine 100 in some configurations comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the present invention.

Various components of wind turbine 100 in the illustrated configuration are housed in nacelle 102 atop tower 104 of wind turbine 100. The height of tower 104 is selected based upon factors and conditions known in the art. In some configurations, one or more microcontrollers comprise a control system are used for overall system monitoring and control including pitch and speed regulation, high-speed shaft and yaw brake application, yaw and pump motor application and fault monitoring. Alternative distributed or centralized control architectures are used in some configurations. The pitches of blades 108 can be controlled individually in some configurations such that portions of each blade 108 are configured to rotate about a respective pitch axis 112. Hub 110 and blades 108 together comprise wind turbine rotor 106. Rotation of rotor 106 causes a generator (not shown in the figures) to produce electrical power.

Figure 2:
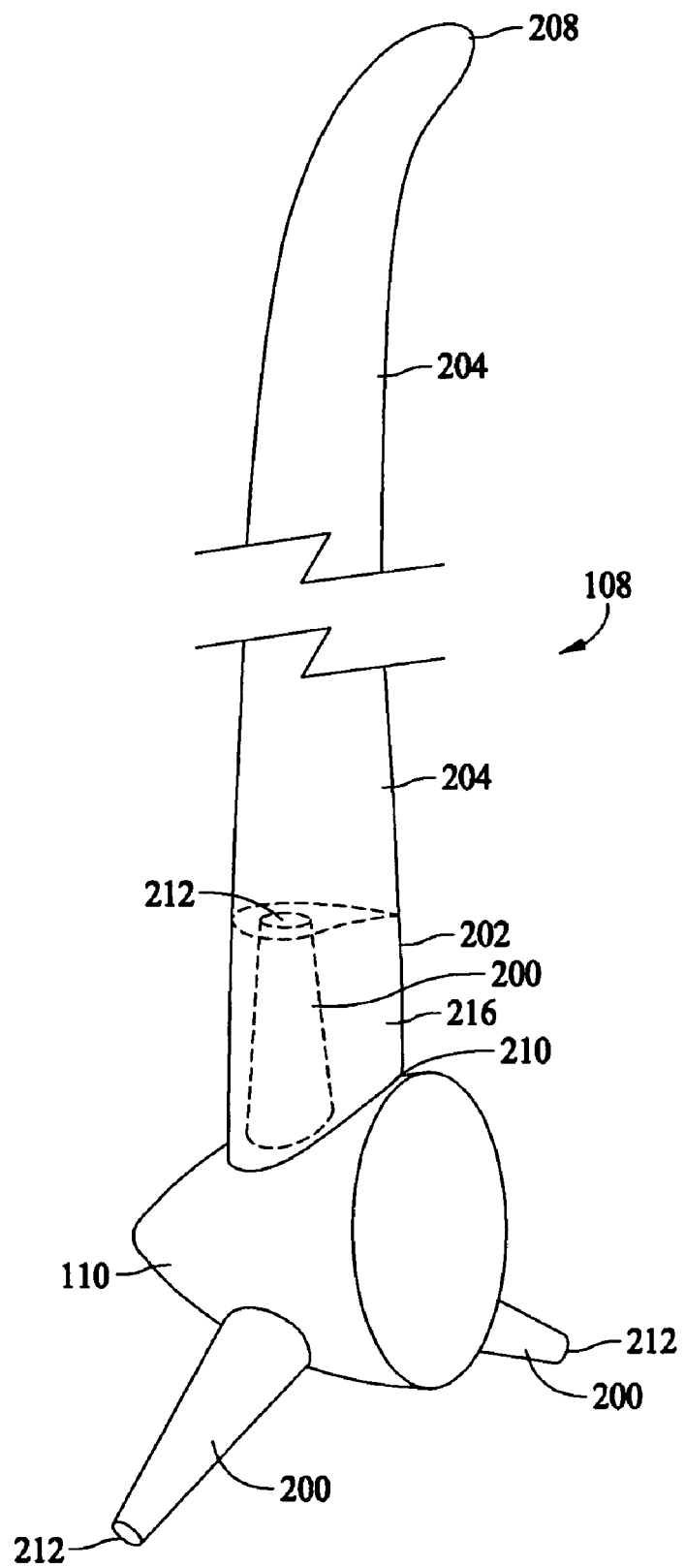
FIG. 2 is a representation of a partially assembled rotor of the wind turbine configuration of FIG. 1.

In some configurations of the present invention and referring to FIGS. 1 and 2, blades 108 comprise a plurality of sections that can be separately shipped or manufactured on-site to facilitate transportation and/or take advantage of differences in the way inboard sections and outboard sections can be manufactured.

For example, some configurations of blades 108 comprise three sections, namely, a hub extender 200, a skirt or fairing 202, and an outboard section 204. In some configurations, blade 108 is divided at a selected distance (e.g., about 30%) from blade root 210. In these configurations, skirt or fairing 202 comprises about 30% of the length of an assembled blade 108 from blade root 210, and outboard section 204 comprises the remaining length. Skirt or fairing 202 fits over hub extender 200 fixedly (so as not to rotate or move) in some configurations, or is mechanically coupled to outboard section 204 (e.g., by gluing, bolting, attachment to a frame, or otherwise affixing the fairing thereto). Hub extender 200 is affixed to hub 110 and has a bearing 212 at an end of hub extender 200 opposite its mounting point at hub 110.

In some configurations, outboard section 204 is configured to provide an aeroelastic coupling, while inboard sections 200 and 202 are configured so as not to provide such coupling. The aeroelastic coupling is provided in some of these configurations using forward or rearward sweep (or a combination thereof) of outboard sections 204 of blades 108 near tips 208. In other configurations, aeroelastic coupling is provided through off-axis lay-up of laminate plies (not shown in the Figures) in outboard section 204 to achieve twist-bend coupling.

Blade sections 200, 202 and/or 204 can be constructed using carbon fiber and/or other construction material. In some configurations in which it is used, an extra economy is achieved by limiting the use of carbon fiber to outer parts (i.e., those portions outboard of bearing 212, i.e., outboard section 204) of rotor blades 108, where the carbon fibers provide maximum static moment reduction per pound. This limitation also avoids complex transitions between carbon and glass in rotor blades and allows individual spar cap lengths to be shorter than would otherwise be necessary. Fabrication quality can also be enhanced by this restriction. Another advantage of multiple piece blades 108 is that different options can be used or experimented with during the development or life of a rotor 106.

Pitch bearing 212 is located at an outboard end of hub extender 202. Advantageously, a relatively small diameter pitch bearing 212 can be used at this location to move only outboard section 204, in contrast to prior art one-piece blades that require the use of a pitch bearing at their root to move the entire blade. Moreover, the overall system is more agile, in that outboard section 204 has less inertia than that of a whole blade, so neither bearing 212 nor the motors that operate it have to be sized for the whole blade. Hub extender 200 is frustoconical or cylindrical in some configurations, and may comprise or consist of filament-wound carbon or glass. Outboard section 204 in some configurations comprises a hybrid composite structure incorporating aerodynamic coupling. Skirt or fairing 202 covers inboard section 200 when the blade is assembled. Skirt or fairing 202 may pitch with outboard section 204 to ensure high aerodynamic efficiency to provide a bending moment that assists in reducing an outboard section 204 induced bending moment about pitch bearing 212 during normal operation.

Figure 3:
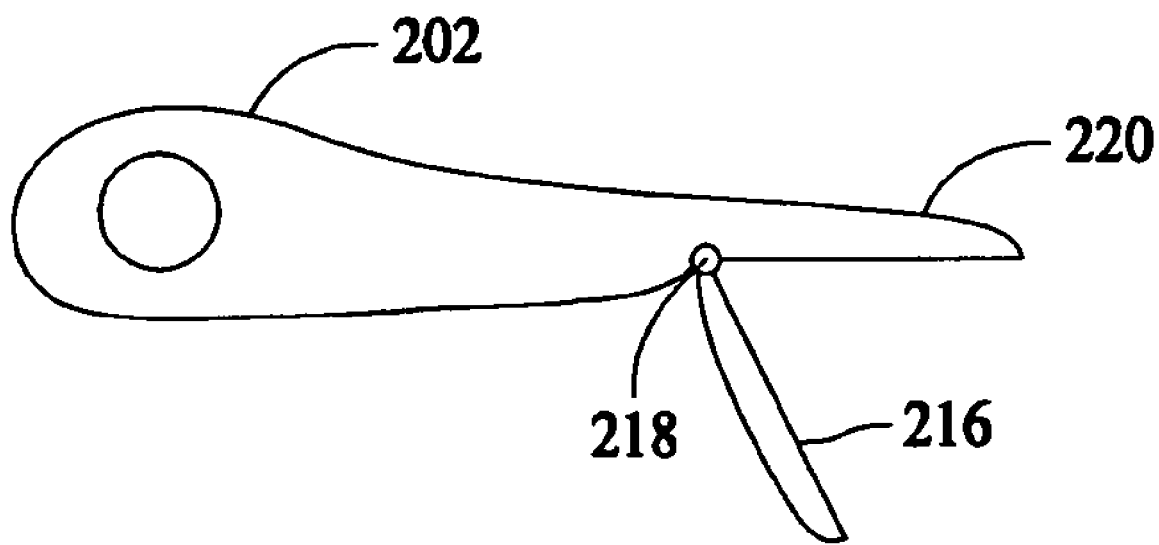
FIG. 3 is a sectional view of a configuration of a skirt or fairing of a multipiece blade that incorporates a flap for creating drag to reduce lift in stormy weather conditions.

Rotor 106 of wind turbine 100 may be parked during adverse conditions such as storms. Skirt or fairing 202 advantageously reduces parked loads under such conditions by killing an inboard lift contribution when idling. For example, and referring to FIG. 3, a fixed inboard skirt or fairing 202 and outboard section 204 (shown in FIGS. 1 and 2) are provided. To kill the inboard lift contribution when idling, a moveable flap 216 is provided at the narrow end of inboard skirt or fairing 202 to create drag and reduce lift for situations such as storm loading. More particularly, FIG. 3 shows a section through skin or fairing 202. When necessary, flap 216, opens at hinge 218, to form either a V- or T-shaped opening as shown in FIG. 3. From whichever direction wind blows, it will strike a baffler on this flap and create substantial drag and reduce lift. By providing a V- or a T-shape rather than an L shape, wind direction sensitivity for providing drag and reducing lift is reduced. Flap 216 in some configurations is moved by a mechanical device (not shown in the figures) that links the opening of the flap to the outer portion. By locating the flap on inboard skirt or fairing 202 rather than placing it at an outboard location, the flap is advantageously more likely to survive for its target lifetime, in contrast to some prior art single piece blade configurations in which a flap is placed at an outboard location where there is considerable flexibility. This flexibility can result in premature failure of a flap, especially for large blades, e.g., blades about 20 meters long. In some configurations, portion 220 of skirt or fairing 202 is hinged instead of, or in addition to, flap 216, so that section 220 operates as a flap.

Figure 4:
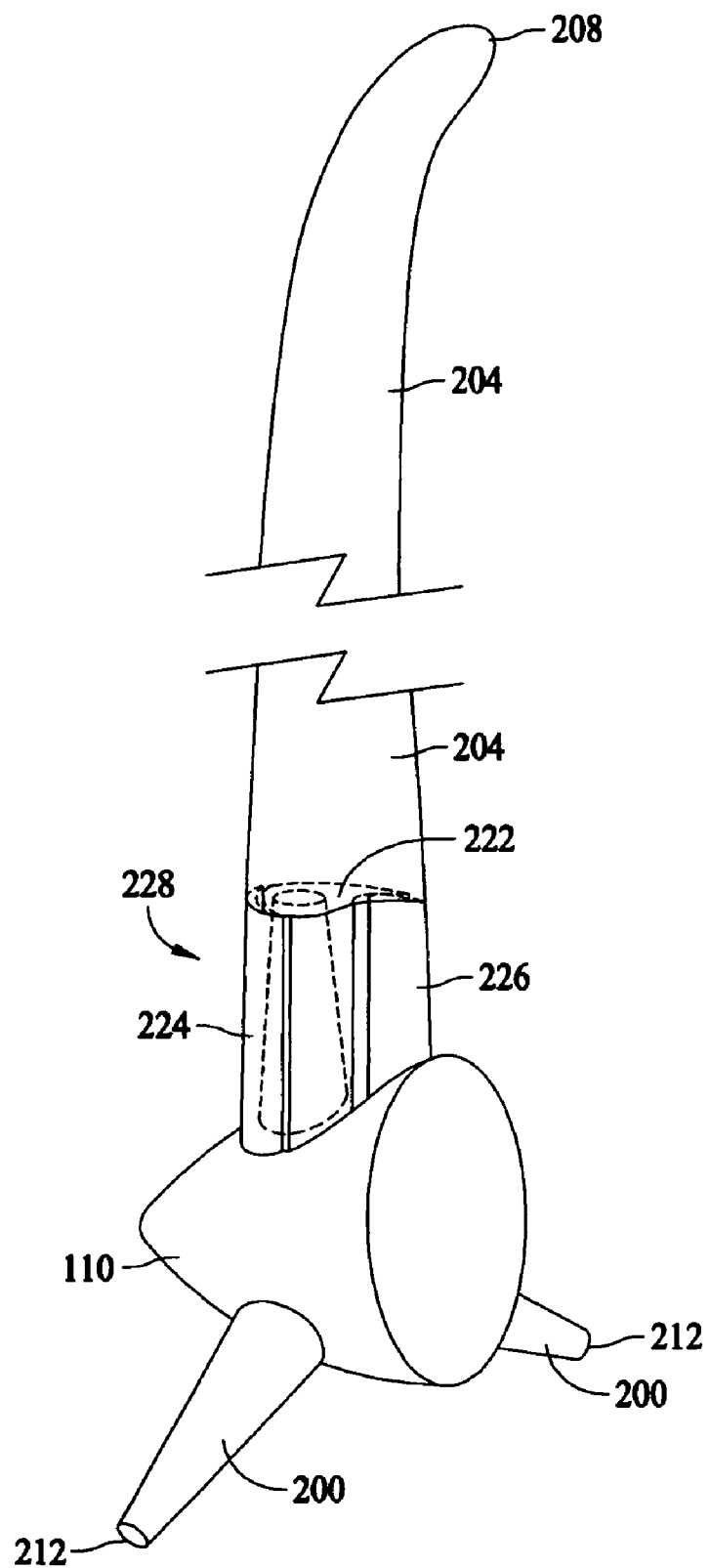
FIG. 4 is a representation of a partially assembled rotor of the wind turbine configuration of FIG. 1 wherein the blades have an alternative skirt or fairing configuration.

To assemble a rotor of a wind turbine at a wind turbine site, the pieces of the multisection blade 108 can be shipped to the site unassembled as separate components and/or manufactured on site, thereby reducing the length of trucks, train ears, or other transportation vehicles used to transport the blade. The blade is then assembled on site. For example, part of the hub extender 200 and outboard section 204 can be shipped to a wind turbine site separately or together, but as separate components. Advantageously, neither hub extender 200 nor outboard section 204 is as long as a prior art blade having the assembled length of multipart blade 108, so transportation costs are reduced. Skirt or fairing 202 can be shipped to the site together or separately from hub extender 200 and/or outboard section 204, but as a separate component from either. As an alternative, any of the parts of blade 108 can be fabricated on site. In many such alternative configurations, hub extender 200 and outboard section 204 are shipped to the site and skirt or fairing 202 is fabricated on site as an integrated whole. Referring to FIG. 4, some such configurations utilize an alternative skirt or faking 228 that can be fabricated as a plurality of spanwise slices 222, 224, and 226 in a manner similar to Fowler flap. In either case, a hub extender 200 having a pitch bearing at one end is fixedly attached at the other end to hub 110, and skirt or faking 202 or 228 is either fixedly mounted over hub extender 200 or is mechanically coupled to outboard section 204 and over hub extender 200. In the case of skirt or fairing 228, each slice 222, 224, and 226 in some configurations is fixedly coupled a plate (not shown) on outboard section 204 and to hub 110 or a plate (not shown) thereon or therein. Outboard section 204 itself is coupled to pitch bearing 212 on hub extender 200. Note that mounting the skirt or fairing over the hub extender comprises the hub extender being inserted into a hole of the skirt or fairing.

It will thus be appreciated that configurations of the present invention provide highly transportable components that can be assembled into large rotors at wind turbine sites. Also, various configurations of the present invention provide a method for more conveniently shipping and assembling rotors at wind turbine sites.

While the invention has been described in terms of various specific embodiments, those skilled in the art will recognize that the invention can be practiced with modification within the spirit and scope of the claims.

What is claimed is:

1. A multisection blade for a wind turbine comprising:
   a hub extender having a pitch bearing at one end, said hub extender being substantially frustoconical;
   a skirt or fairing having a hole therethrough and configured to mount over said hub extender; and
   an outboard section configured to couple to said pitch bearing.

2. A multisection blade in accordance with claim 1 wherein said skirt or fairing comprises about 30% of the length of the assembled blade.

3. A multisection blade in accordance with claim 1 wherein said outboard section is configured to provide an aeroelastic coupling, and said hub extender and said skirt or fairing is not.

4. A multisection blade in accordance with claim 3 wherein said aeroelastic coupling is provided with a forward or rearward sweep or combination thereof near tips of said outboard section.

5. A multisection blade in accordance with claim 3 wherein said aeroelastic coupling is provided by off-axis lay-up of laminate plies in said outboard section to achieve twist-bend coupling.

6. A multisection blade in accordance with claim 1 comprising carbon fiber, and said carbon fiber is limited to said outboard section of said blade.

7. A multisection blade in accordance with claim 1 wherein said skirt or fairing is configured to pitch with said outboard section.

8. A multisection blade in accordance with claim 1 wherein said skirt or fairing includes a hinged flap that, when open, forms a V- or T-shaped opening.

9. A multisection blade in accordance with claim 1 wherein said skirt or fairing comprises a plurality of spanwise slices.

10. A wind turbine having a rotor that comprises at least one multisection blade, said at least one multisection blade comprising:
   a hub extender having a pitch bearing at one end, said hub extender being substantially frustoconical;
   a skirt or fairing having a hole therethrough and configured to mount over said hub extender; and
   an outboard section configured to couple to said pitch bearing.

11. A wind turbine in accordance with claim 10 wherein said skirt or fairing comprises about 30% of the length of the assembled blade.

12. A wind turbine in accordance with claim 10 wherein said outboard section is configured to provide an aeroelastic coupling, and said hub extender and said skirt or fairing is not.

13. A wind turbine in accordance with claim 12 wherein said aeroelastic coupling is provided with a forward or rearward sweep or combination thereof near tips of said outboard section.

14. A wind turbine in accordance with claim 12 wherein said aeroelastic coupling is provided by off-axis lay-up of laminate plies in said outboard section to achieve twist-bend coupling.

15. A wind turbine in accordance with claim 10 wherein said skirt or fairing is configured to pitch with said outboard section.

16. A method for assembling a rotor of a wind turbine at a wind turbine site, said method comprising:
   shipping unassembled parts of a multisection rotor blade to the site, the unassembled parts including at least one hub extender having a substantially frustoconical shape, at least one outboard section, and at least one skirt or fairing that is separate from the outboard section; and
   assembling the multisection rotor blade at the site such that the outboard section and the skirt or fairing are rotatable together about a respective pitch axis of the rotor blade.

17. A method in accordance with claim 16 further comprising fabricating the skirt or fairing of the rotor blade at the site.

18. A method in accordance with claim 17 wherein the skirt or fairing is manufactured as a plurality of spanwise slices.

19. A method in accordance with claim 16 wherein said assembling the multisection rotor blade at the site further comprises:
   fixedly attaching a first end of the hub extender having a pitch bearing at its other end to a hub of the rotor;
   mounting the skirt or fairing over the hub extender; and
   coupling the outboard section to the pitch bearing of the hub extender.

20. A method in accordance with claim 19 wherein the skirt or fairing is mechanically coupled to the outboard section.

* * * * *